Sept. 3, 1935.  C. H. WILLIS  2,013,454
ELECTRIC POWER TRANSMISSION
Filed Dec. 20, 1934  3 Sheets—Sheet 1
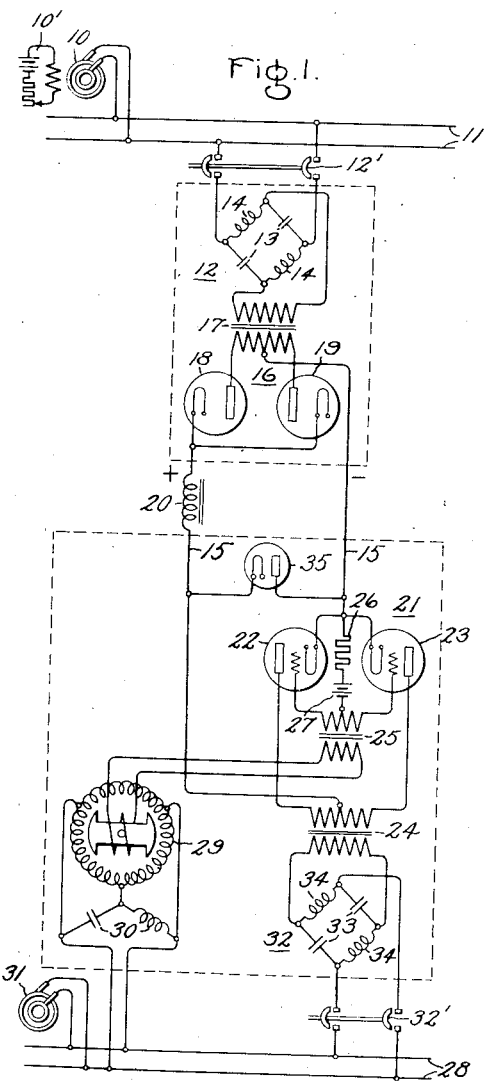
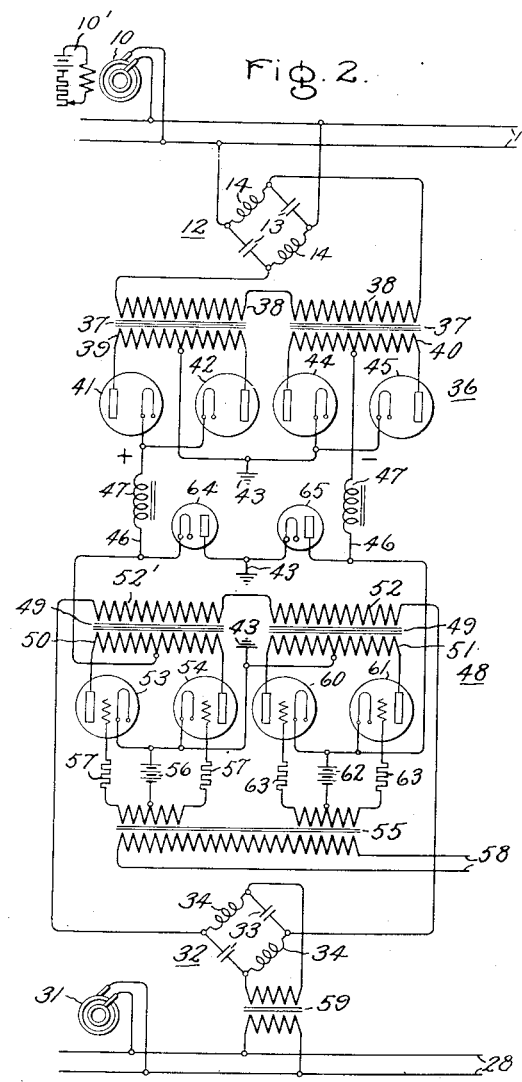
Inventor:
Clodius H. Willis,
by Harry E. Dunham
His Attorney.

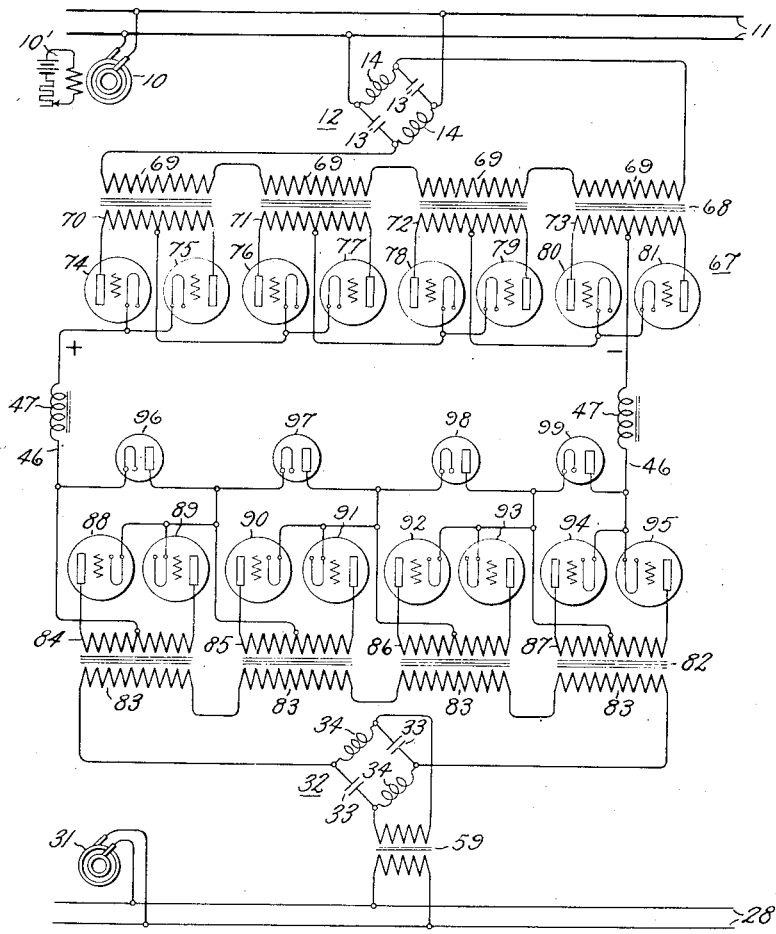

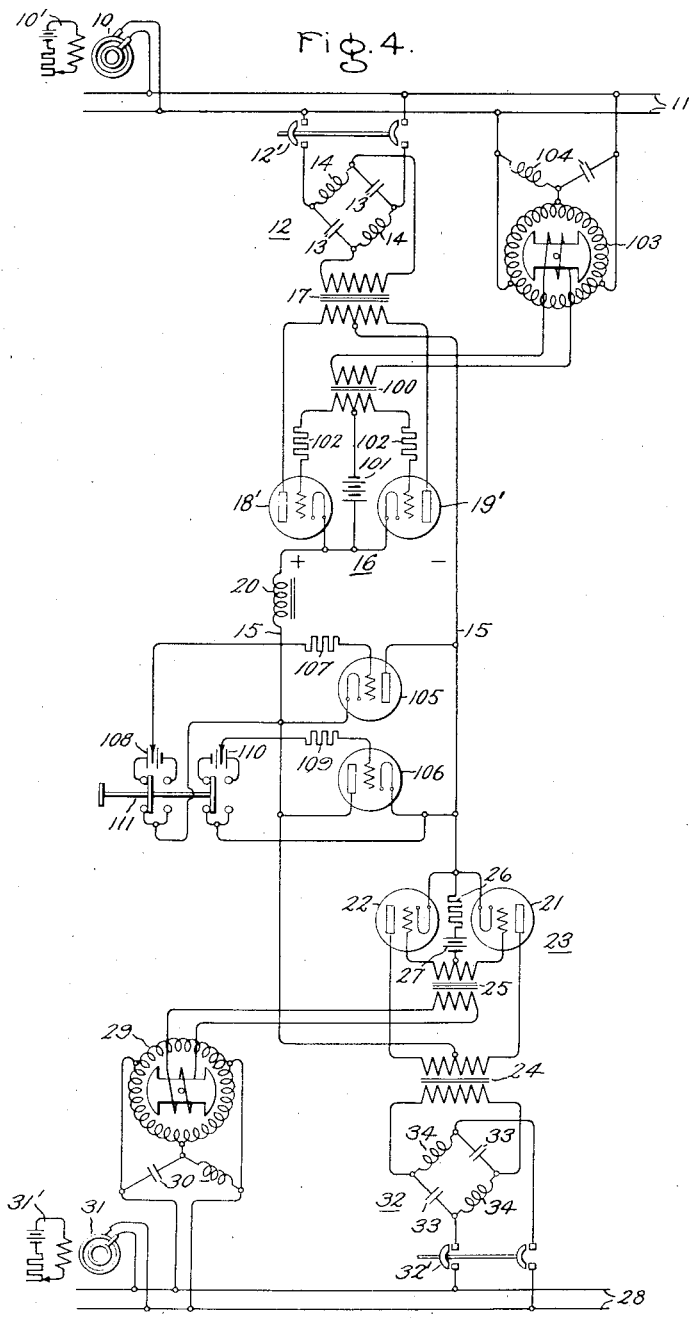

Patented Sept. 3, 1935

2,013,454

UNITED STATES PATENT OFFICE 2,013,454

ELECTRIC POWER TRANSMISSION

Clodius H. Willis, Princeton, N. J., assignor to General Electric Company, a corporation of New York Application December 20, 1934, Serial No. 758,397

14 Claims. (Cl. 171—97)

My invention relates to electric power transmission and distribution systems and more particularly to the transmission and distribution of power with constant direct current.

While my invention is generally applicable for use in connection with electric valve converting apparatus it is particularly applicable for use in high voltage direct-current power transmission systems of the type described and claimed in United States Letters Patent No. 1,990,758, granted February 12, 1935, upon an application of Charles W. Stone and assigned to the assignee of the present application. Briefly described, the system as disclosed in the Stone patent comprises a source of energy of constant voltage alternating current which is transformed to alternating current of constant value and then rectified by an electric valve rectifier for transmission at high-voltage direct current. The constant direct current is transmitted over a transmission circuit to a receiving circuit which includes an electric valve inverter for changing the transmitted energy to alternating current of constant value which is transformed to alternating current of constant voltage for distribution purposes. The electric valve converting stations of this system employ as one means of transforming alternating current from constant-voltage to constant-current or vice versa, an impedance network comprising reactances of opposite sign and which in the single phase type are arranged in the form of a square known in the art as a monocyclic square.

It is an object of my invention to provide a new and improved method and apparatus for transmitting and distributing electric power by means of electric valve converting apparatus.

It is another object of my invention to provide a new and improved method and apparatus for initiating operation of an electric transmission system of the type wherein energy is transmitted from a source of constant voltage alternating current to a constant voltage alternating current receiving circuit by means of constant direct current.

It is a further object of my invention to provide new and improved means for controlling the reversal of power flow in electric transmission systems of the type referred to above.

The novel features which I believe to be characteristic of my invention are set forth with particularity in the appended claims. The invention itself, however, will be better understood by reference to the following description taken in connection with the accompanying drawings in which Fig. 1 shows diagrammatically a simple embodiment of my invention showing a single phase system adapted for transmitting power in a single direction, Fig. 2 shows diagrammatically another embodiment of my invention in which the transmission system is arranged so that half of each converter apparatus may be operated independently to an ungrounded or grounded neutral conductor, Fig. 3 shows diagrammatically a modification of the arrangement shown in Fig. 2 wherein a plurality of more than two groups of electric valves are connected in series relation for independent operation of any one or more groups of electric valves of each converter apparatus to an ungrounded neutral, and Fig. 4 shows diagrammatically a simplified embodiment of my invention for a single phase circuit adapted for transmitting power in either direction between two alternating current circuits.

Referring now to Fig. 1 of the drawings, a source of constant voltage alternating current 10, provided with excitation controlling means 10' is connected to energize an alternating current circuit 11. The alternating current of constant voltage from the circuit 11 is transformed to alternating current of constant value by means of a transforming apparatus 12 comprising reactances of opposite sign which I designate generally as a monocyclic network. As illustrated, I have shown by way of example capacitors 13 and inductors 14 arranged alternately in the form of a square and known in the art as the monocyclic square. The constant potential alternating current circuit 11 is connected to alternate points of the square through a circuit interrupting device 12' and the conjugate points of the square are connected to supply alternating current of constant value. The constant current output from the square 12 is rectified for a direct current transmitting circuit 15 by a rectifier 16. The rectifier 16 comprises a transformer 17 and a pair of electric discharge devices 18 and 19 connected in a well known manner to provide full wave rectification. The electric discharge devices 18 and 19 are each provided with an anode and a cathode and may be any of the several types known in the art although I prefer to use discharge devices of the vapor or gaseous type. The direct current terminals of the rectifier 16 are connected to the transmission circuit 15 through a smoothing reactor 20 connected in series relation therewith.

An inverter 21 is connected in series relation with the constant direct current circuit 15. The inverter will receive the constant direct current from the circuit 15 and will invert this direct current into alternating current of constant value. The inverter 21 may be any of the several types well known in the art and I have illustrated, by way of example, a well known form of inverter of the parallel type. The present arrangement as illustrated comprises a pair of electric valves 22 and 23 connected to the primary winding of a transformer 24. The electric valves 22 and 23 are preferably of the vapor electric type and are each provided with an anode, a cathode and a control electrode or grid which is connected to the common cathode circuit of these valves through opposite halves of the secondary winding of a grid transformer 25, a current limiting resistor 26 and a bias battery 27. The primary winding of the grid transformer 25 is connected to be energized from an alternating current circuit 28 through a suitable phase shifting arrangement such, for example, as a rotary phase shifting transformer 29 provided with phase splitting means 30. An independent source of electromotive force 31 is connected to the distribution network 28 for determining the frequency of the inverted alternating current and for initiating the operation of the system when started from the receiver end. The constant alternating current traversing the secondary winding of transformer 24 is transformed to alternating current of constant voltage by means of a monocyclic network 32 which I have illustrated, by way of example, in the form of a monocyclic square having two capacitors 33 and two inductors 34 arranged alternately in the form of a square. The output terminals of the square are connected to the circuit 28.

In accordance with the broader aspects of my invention for initiating operation of the system, the direct current circuit 15 may be short circuited by a suitable switch and the starting procedure followed as outlined below. However, by reason of the inherently automatic action of a unidirectional conducting device during the starting operation of the system and in the event of reverse power conditions, I prefer to use a unidirectional conducting device 35 connected permanently across the direct current circuit 15. A suitable unidirectional conducting device is a vapor electric valve and as illustrated in this embodiment of my invention the device 35 comprises a two-electrode vapor electric valve having its anode connected to the negative side of the circuit 15 and its cathode connected to the positive side of the circuit 15 so as to be conductive to current flow from the inverter 21 when operating as a rectifier. This arrangement of the valve 35 provides for the transmission of power from the circuit 11 to the circuit 28.

The general principles of the operation of the converter and transforming apparatus referred to in the above-described system will be understood by those skilled in the art and may be briefly summarized as follows. The alternating current of constant voltage delivered to the bus 11 is transformed to alternating current of constant value by the monocyclic square 12, rectified by the rectifier 16 to provide full wave rectification in a well known manner to deliver to the transmitting circuit 15 direct current of constant value. The direct current of constant value is delivered to the series connected inverter 21 and inverted and supplied to the network 28 as constant voltage alternating current. Briefly stated, the constant direct current is converted into alternating current of constant value by means of the electric valves 22 and 23 and their associated grid circuits in the secondary winding of transformer 24. Assuming that valve 22 is initially made conducting, current will flow from the positive direct current line through the left-hand portion of the primary winding of transformer 24 through the valve 22 to the circuit 15. In accordance with the method of commutation employed in the illustrated arrangement, the transfer of current from valve 22 to valve 23 is effected by phase commutation or, in other words, by the instantaneous difference in potential of the respective anodes of the valves. The general combination of phase commutated converting or inverting electric valve means with power factor changing or inverting means, such as a monocyclic network, is described and claimed in my copending joint application with Burnice D. Bedford, Serial No. 758,396, filed concurrently with this application and assigned to the assignee of the present application.

The general method of initiating operation of the system as illustrated in Fig. 1 assuming a simple short-circuiting switch to be used across the circuit 15 and grid controlled converters at each end is as follows: First, disconnect one or the other of the converter stations 16 or 21 from its associated alternating current circuit and then apply full voltage to the converting station remaining connected to the system while the short-circuiting switch is closed. Under these conditions the converter operates as a rectifier and establishes full load current circulating through the short-circuited direct current circuit. The disconnected converter station is now adjusted so as to be capable of feeding into the direct current circuit a direct current less than that supplied by the initially connected converter. The disconnected converter is connected to be energized from its associated alternating current circuit and tends to circulate a reduced current through the short circuit in a direction opposite to the current from the previously connected converter. When the converters at the respective ends are adjusted to give the same current in the direct current circuit, the short-circuited path, which carries the difference of the two currents, carries no current and the short circuiting device may be opened. A further small rise in the current supplied by one of the converters causes the other to swing over to inverter action and take load because the monocyclic network associated with the converter now to be operated as an inverter tries to hold constant current. In this way the direct current voltage and the corresponding load may be established. The manner of controlling the power flow is closely analogous to the control of power flow between two direct current constant voltage shunt generators. A small change in voltage of either shunt generator is sufficient to cause a large change in power flow. Similarly, in a constant current circuit of the type herein described a small change in current is sufficient to cause a large change in direct current voltage and therefore load. For example, I have found that a five per cent change in current is sufficient to effect a change in load from no load to full load.

When the electric valve 35 is employed as the short-circuiting device and connected as illustrated in Fig. 1, the method of initiating operation is in accordance with the method outlined hereinbefore except that the operation is started from the receiving circuit 28. Briefly described, the method is as follows: The rectifier 16 is disconnected from the supply circuit 11 by opening the switch 12' and full voltage is applied to the inverter 21 by closing the switch 32'. Under these conditions the inverter begins operation as a rectifier and establishes full load current circulating through the direct current circuit by way of the valve 35. Adjustments are made at the rectifier end, for example by adjusting the excitation controlling means 10' so that the rectifier is capable of feeding into the circuit 15 a direct current less than that supplied by the inverter 21. The rectifier 16 is then energized from the circuit 11 by closing switch 12' and tends to reduce the current traversing the valve 35. When the rectifier 16 and inverter 21 are adjusted to give the same current, the valve 35 carries no current. With this arrangement it is not necessary to open the short-circuiting path because this is effected automatically by the unidirectional conductive characteristic of the valve 35. A further small rise in the current supplied by the rectifier 16 causes the converter 21 to swing over to inverter operation and take load because the monocyclic network 32 tries to hold constant current. The direct current voltage and the corresponding load are thereby established. It will be observed that the electric valve 35 acts as an automatic reverse power relay and prevents the inverter from feeding power back if the rectifier voltage decreases below its normal operating value. The circuit automatically passes to a condition of short circuit if the inverter tends to reverse the power flow.

In case of an accidental short circuit in circuit 15 the current through the short circuit is much less than the line current because only the difference between the no load currents of the rectifier and inverter is available for the short circuit. I have found that the short circuit current may be of the order of ten per cent of the line current. In a 150 kw. developmental apparatus I have found that less than 2 amperes flows in the short-circuiting path in a system operating normally at ten amperes constant current at 15000 volts.

In Fig. 2 I have shown another embodiment of my invention which is adapted for operating either half of the rectifier or inverter to neutral independently by using two or more groups of tubes in series. The general features of the system are similar to the system shown in Fig. 1 in that means are provided for converting alternating current of constant voltage to alternating current of constant value which is rectified and transmitted as constant direct current. The constant direct current is inverted to alternating current of constant value and finally transformed to constant voltage alternating current for utilization purposes. Corresponding elements of the two systems are designated by the same numerals. I have illustrated a source of alternating current 10 which may be one of a number of constant voltage alternating current generating means connected to energize a generator bus 11. The source of alternating current 10 is provided with excitation controlling means 10'. The constant voltage alternating current from bus 11 is transformed to alternating current of constant value by means of a monocyclic square 12 comprising two capacitors 13 and two inductors 14 arranged alternately in the form of a square. The input terminals of the monocyclic square 12 are connected to the bus 11. The constant current output terminals of the square are connected to a rectifier arrangement 36. In order to provide for independent operation of either half of the inverter or rectifier apparatus, I use rectifying means on each side of the circuit. The rectifier 36, as illustrated, comprises transformers 37 having primary winding 38 and two secondary windings 39 and 40. The secondary winding 39 is connected with its outer terminals to a pair of electric discharge devices or electric valves 41 and 42 which are arranged in a well known manner to provide full wave rectification. The electrical midpoint of the secondary winding 39 is grounded as indicated at 43 or this connection may be to an ungrounded neutral conductor if desired. The cathode connection of this group of valves furnishes the positive side of the transmission circuit. Similarly, the outer terminals of the secondary winding 40 are connected to another pair of electric discharge devices or electric valves 44 and 45 which are arranged in a well known manner to provide full wave rectification. The electrical midpoint of the secondary winding 40 is connected to the negative side of the transmission circuit and the cathode connection of this group of valves is connected to the neutral connection 43. The transmission circuit is indicated by the conductors 46 in which are connected smoothing reactors 47. The electric valves 41, 42 and 44, 45 are each provided with an anode and a cathode and may be any of the several types well known in the art, although I prefer to use valves of the vapor or gaseous type.

For the other terminal of the transmission circuit I provide an inverter 48 which is similar in equipment to the rectifying apparatus 36, except that the electric valves are equipped with control electrodes or grids and are arranged for inverting from constant direct current to constant alternating current. For simplicity in explaining this embodiment of my invention, I have shown the same general type of inverter as that shown in the illustrated embodiment of Fig. 1, except for the special arrangement of the inverters for each side of the circuit. As illustrated, I provide transformers 49 having primary windings 50 and 51 respectively, and secondary windings 52 and 52'. A pair of electric valves 53 and 54 are connected to the outer terminals of the primary winding 50 for inverting the constant direct current to alternating current of constant value. The valves 53 and 54 are preferably of the vapor electric type and are each provided with an anode, a cathode and a control electrode or grid which is connected to the common cathode circuit of these valves through opposite halves of a secondary winding of a grid transformer 55, a negative bias battery 56 and current limiting resistors 57. The primary winding of the grid transformer 55 may be energized from any suitable alternating current circuit 58 of a frequency which it is desired to supply to the circuit 28. The positive side of the direct current circuit 46 is connected to the electrical midpoint of primary winding 50 while the common cathode circuit of this group of valves is connected to the neutral conductor and illustrated as a ground 43. Similarly, another pair of electric valves 60 and 61 are connected to the outer terminals of the primary winding 51 for converting the constant direct current to alternating current of constant value. Each of these valves is also preferably of the three-electrode vapor electric type with a grid which is connected to the common cathode circuit thereof through opposite halves of another secondary winding of grid transformer 55, a bias battery 62 and current limiting resistors 63. The electrical midpoint of primary winding 51 is connected to the neutral conductor 43 while the common cathode circuit of the valves 60 and 61 is connected in the negative side of the transmission circuit 46.

The constant value alternating current output from the transformer windings 52 and 52' is transformed to constant voltage alternating current by means of a monocyclic network 32 comprising capacitors 33 and inductors 34 arranged alternately in the form of a square with the input terminals connected to transformer windings 52 and 52' and the output terminals connected to the constant voltage alternating current circuit 28 through a transformer 59 which may be interposed if desired.

In order to provide for operation of either half of the inverter or rectifier apparatus independently two unidirectional conducting devices, such as the electric valves 64 and 65, are connected in series relation across the direct current circuit 46 and arranged so as to be conducting in the direction of the flow of current from the inverter operating as a rectifier. Two-electrode vapor electric valves each having an anode and a cathode are satisfactory. The cathode of valve 64 is connected to the positive conductor of the direct current circuit 46 and its anode is connected to the cathode of valve 65. The anode of valve 65 is connected to the negative conductor of the direct current circuit 46. The junction point between the anode of valve 64 and cathode of valve 65 is connected to neutral conductor 43.

The general principles of operation of the arrangement illustrated in Fig. 2 are substantially the same as for the arrangement illustrated in Fig. 1. The constant voltage alternating current from the source 10 is transformed by the monocyclic square 12 to alternating current of constant value. By means of the respective groups of rectifiers comprising the valves 41 and 42 and 44 and 45 constant direct current at double the voltage of the separate groups of valves is delivered to the transmission circuit 46. The power delivered at the inverter 48 is inverted in accordance with the operating principles described in connection with Fig. 1 by each group of inverters comprising valves 53 and 54 and 60 and 61 to provide alternating current of constant value in transformer winding 52. The monocyclic square 32 transforms the alternating current of constant value to constant voltage alternating current for use in the alternating current circuit 28.

The method of initiating the operation of the system is the same as that described in connection with the arrangement illustrated in Fig. 1. If it is desirable to use either half of the rectifier unit or the inverter unit to neutral independently the method of starting will be the same since the electric valves 64 and 65 are so disposed and connected as to provide a path for the current from the total inverter unit acting as a rectifier or for either half acting independently.

If it is desirable to employ more than two groups of valves in the rectifier and inverting stations the arrangement diagrammatically illustrated in Fig. 3 may be employed. Corresponding parts in this arrangement are designated by the same numerals as in Figs. 1 and 2. The output terminals of the monocyclic square 12 are connected to energize a rectifier 67 through transformers 68 having primary windings 69 and four secondary windings 70, 71, 72, and 73. The secondary winding 70 is connected with its outer terminals to a pair of electric valves 74 and 75 which are arranged in the well known manner to provide full wave rectification. The several groups of valves 76 and 77, 78 and 79, and 80 and 81 are connected to secondary windings 71, 72, and 73, respectively, in the same manner. The cathode connection of the first group 74—75 is connected to the positive side of the direct current circuit 46. The electrical midpoint of each transformer winding is connected to the cathode circuit of the next succeeding group of valves so that the groups of valves are connected in series relation. The electrical midpoint of the secondary winding 73 of the last group of valves is connected to the negative conductor of the direct current circuit. The electric valves 74 to 81, inclusive, are each provided with an anode and a cathode and may be provided with a grid as indicated if grid control on the rectifier is desirable. These valves may be any of the several types known in the art although I prefer to use valves of the vapor or gaseous type. The inverter is similar in arrangement to the rectifier unit and comprises transformers 82 with primary windings 83 and four secondary windings 84, 85, 86, and 87. Groups of valves 88 and 89, 90 and 91, 92 and 93, and 94 and 95 are connected to the secondary windings 84, 85, 86, and 87, respectively, for inverter operation with the respective groups connected in series relation in the same manner as the rectifier groups. The positive direct current conductor of the circuit 46 is connected to the electrical midpoint of the transformer 84 and the cathode connection of the opposite end of the groups of valves is connected to the negative conductor of the circuit 46. While I have indicated control electrodes for the several valves of the rectifier and inverter units, which is to be taken as representative of suitable grid control circuits, no grid control circuit details have been illustrated in order to avoid complicating the disclosure. My invention is not directed to the details of the rectifier or inverter circuits and suitable grid control circuits, such as the type of grid control circuits illustrated in Figs. 1 or 2, may be readily adapted for the particular rectifier and inverter units selected for carrying out my invention.

In order to provide for operation of any one or several of the rectifier or inverter groups independently, I connect across the direct current circuit a number of unidirectional conducting devices corresponding to the number of inverter groups of valves. In the arrangement as illustrated, since there are four groups of inverter valves, I connect four two-electrode valves 96, 97, 98, and 99 in series relation across the direct current circuit 46 and arranged so as to be conducting in the direction of the flow of current from the inverter operating as a rectifier. With the polarities assumed the cathode of valve 96 is connected to the positive side of the direct current circuit 46 and the anode is connected to the cathode of the next valve 97 and thence through valves 98 and 99 in the same order so that the anode of valve 99 is connected to the negative side of the direct current circuit. The junction point between the anode of valve 96 and the cathode of valve 97 is connected to the cathode connection of the inverter valve group 88—89. Similarly, a corresponding point between valve groups 97 and 98, and 98 and 99 are connected to the cathode connection of valve groups 90 and 91, and 92 and 93, respectively.

It is believed that the operation of the arrangement illustrated in Fig. 3 will be obvious from the description of the operation of the system as given in connection with Fig. 1 and that no further description is necessary for an understanding of this embodiment of my invention.

In Fig. 4 I have shown diagrammatically an embodiment of my invention adapted for transmitting power in either direction over the direct current transmitting circuit. For the purpose of simplifying the disclosure I have shown the same circuit arrangement as is shown in Fig. 1 except as hereinafter pointed out and have designated like parts by the same reference numerals. The rectifier 16 is provided with electric valves 18' and 19' each of which is provided with a control electrode or grid to provide for the necessary inverter operation when each terminal station is required to operate as a rectifier or an inverter. The grid of each valve is connected to the common cathode circuit through opposite halves of a secondary winding of a grid transformer 100, a negative bias battery 101, and current limiting resistors 102. The primary winding of the grid transformer may be energized from any suitable alternating current circuit and as illustrated it is connected to be energized from the circuit 11 through a phase shifting device illustrated as a rotary phase shifting transformer 103 provided with phase splitting means 104.

In order to transmit power in the opposite direction from that outlined in the description of the arrangement illustrated in Fig. 1, one may simply reverse the connection of electric valve 35 so that it is conductive in the opposite direction from that illustrated. As shown in the embodiment of my invention illustrated in Fig. 4, I use two vapor electric valves 105 and 106 connected for conduction in opposite directions and with means for rendering one of the valves non-conductive when the other is conductive to initiate power transmission in the desired direction. The electric valves 105 and 106 are each provided with an anode, a cathode and a control electrode or grid. The electric valve 105 is connected with its anode to the negative side of the direct current circuit 15 and its cathode connected to the positive side so as to conduct the current of the inverter 23 when operating as a rectifier. The electric valve 106 is connected oppositely across the direct current circuit 15 so as to conduct current when the rectifier 16 is operated as rectifier. The grid of the valve 105 is connected through a current limiting resistor 107 to the midpoint of a bias battery 108, while the grid of the valve 106 is connected through a current limiting resistor 109 to the midpoint of a bias battery 110. Switching means 111 is provided for making the grid of valve 105 negative when the grid of valve 106 is made positive and vice versa. Thus when the switch 111 is in the illustrated position the grid of valve 105 is biased negatively and the valve is non-conductive while at the same time the grid of valve 106 is positive and the valve 106 is conductive. When the switch is moved to its operating position to the right the reverse conditions exist.

The operation of the arrangement shown in Fig. 4 is the same as for the arrangement illustrated in Fig. 1. With the switch 111 moved to its operating position to the right the valve 106 is biased negatively and is non-conductive and valve 105 is conductive so that the operation of the system may be initiated as explained in the description of the operation of the arrangement illustrated in Fig. 1. With the operation initiated in this manner power will be from the circuit 11 to the circuit 28. When it is desired to transmit power in the opposite direction that is from circuit 28 to circuit 11 the switch 111 is moved to its operating position to the left, tube 105 is biased negatively and is rendered non-conductive, and tube 106 is rendered conductive. Under these conditions the operation of the system is initiated in the same manner as previously described except that the rectifier 16 is first started up and then the inverter 23 is operated as a rectifier.

By an examination of the circuit conditions when using the two-valve arrangement, it will be observed that I have provided means which automatically controls the reversal of power for a selected direction of power flow. Thus when the switch 111 is left in the position for which a given direction of power flow was established any reversal of power flow will be automatically checked because the short circuiting devices 105 and 106 are each left in a condition which will suppress a reversal of power flow. For example, if the switch 111 is in its illustrated position power flow will be established from the circuit 28 to the circuit 11 since valve 106 is positively biased and conductive and valve 105 is negatively biased and non-conductive. For the conditions assumed a reversal of power flow would be from the circuit 11 to the circuit 28. If power tends to flow from the circuit 11 to the circuit 28 valve 106 automatically puts the system under short circuit and no power is transmitted back to the circuit 28.

While I have shown and described particular embodiments of my invention, it will be obvious to those skilled in the art that various changes and modifications may be made without departing from my invention in its broader aspects, and I, therefore, aim in the appended claims to cover all changes and modifications as fall within the true spirit and scope of my invention.

What I claim as new and desire to secure by Letters Patent of the United States, is,—

1. In combination, an alternating current circuit of constant voltage, an electric valve converter, a constant-voltage constant-current transforming means interposed between said circuit and said converter, a second electric valve converter, a transmission circuit interconnecting said converters, a second alternating current circuit, a constant-voltage constant-current transforming means interposed between said second circuit and said second converter, means for short circuiting said transmission circuit incidental to the initiation of the transmission of power, and means for adjusting the current flow from each of said converters.

2. In combination, an alternating current circuit of constant voltage, an electric valve converter, a constant-voltage constant-current transforming means interposed between said circuit and said converter, a second electric valve converter, a transmission circuit interconnecting said converters, a second alternating current circuit, a constant-voltage constant-current transforming means interposed between said second circuit and said second converter, and a unidirectional conductive device connected across said transmission circuit.

3. In combination, a source of constant direct current, a constant current inverter, a transmission circuit interconnecting said source of direct current and said inverter, a source of alternating current connected to the output side of said inverter, and a unidirectional conductive device connected across said transmission circuit and conductive only in a direction to conduct current from said inverter under rectifier operation.

4. In combination, an electric valve rectifier apparatus for producing constant direct current, an electric valve inverter apparatus for normally changing said constant direct current to alternating current of constant value, a transmission circuit interconnecting said rectifier and inverter apparatus, a source of alternating current connected to the output side of said inverter, a monocyclic network interposed between said inverter and said alternating current circuit, and an electric valve connected across said transmission circuit and provided with an anode connected to the normally negative side of said transmission circuit and its cathode connected to the normally positive side of said transmission circuit.

5. The combination of a source of constant voltage alternating current, means for transforming said constant voltage alternating current to alternating current of constant value, means for converting the alternating current of constant value to direct current of constant value, means for inverting said direct current of constant value to alternating current of constant value, a transmission circuit interconnecting said converting means and said inverting means, means for transforming said alternating current of constant value to alternating current of constant voltage, a second source of constant voltage alternating current connected to said last mentioned transforming means, and a unidirectional conductive device connected across said transmission circuit for conducting the current of said inverter when operating as a rectifier.

6. The combination of a source of constant voltage alternating current, means including a network of reactances of opposite sign for transforming said constant voltage alternating current to alternating current of constant value, means including electric valves for converting the alternating current of constant value to direct current of constant value, means including electric valves for inverting said direct current of constant value to alternating current of constant value, a transmission circuit interconnecting said converting and said inverting means, means including a network of reactances of opposite sign for transforming said alternating current of constant value to alternating current of constant voltage, a source of alternating current connected to said last mentioned transforming means, and an electric discharge device connected across said transmission circuit and having an anode connected to the normally negative side of said transmission circuit and a cathode connected to the normally positive side of said transmission circuit.

7. In combination, electric valve rectifying apparatus for producing constant direct current, said rectifying apparatus comprising a plurality of groups of electric valves connected in series relation, each group of valves being arranged for full wave rectification, electric valve inverting apparatus for changing constant direct current to alternating current of constant value, said inverting apparatus comprising a plurality of groups of electric valves connected in series relation, a transmission circuit interconnecting said rectifying and inverting apparatus, a plurality of unidirectional conducting devices similarly disposed and connected in series relation across said transmission circuit for conduction of current from said inverting apparatus under rectifier operation, the junction points between adjacent unidirectional conducting devices being connected to corresponding junction points between the groups of electric valves of said inverting apparatus.

8. In combination, electric valve rectifying apparatus for producing constant direct current, said rectifying apparatus comprising a plurality of groups of electric valves connected in series relation, each group of valves being arranged for full wave rectification, the neutral point of interconnection between each of said groups of valves being connected to a conductor having a potential intermediate that of the outside terminals of adjacent groups of valves, electric valve inverting apparatus for changing constant direct current to alternating current of constant value, said converting apparatus comprising a plurality of groups of electric valves connected in series relation, a transmission circuit interconnecting said rectifying and inverting apparatus, the neutral point of interconnection between each of said groups of inverter valves being connected to a conductor having a potential intermediate that of the outside terminals of adjacent groups of valves, a plurality of similarly disposed electric valves equal in number to the groups of electric valves of said inverting apparatus connected in series relation across said transmission circuit for conduction of current from said inverting apparatus under rectifier operation, the junction points between said plurality of electric valves being connected to said conductor.

9. In combination, electric valve rectifying apparatus for producing constant direct current, said rectifying apparatus comprising two groups of electric valves connected in series relation, each group being arranged for full wave rectification, the neutral point of interconnection between said groups of valves being connected to a conductor having a potential intermediate the potential of the outside terminal of said rectifying apparatus, electric valve inverting apparatus for changing constant direct current to alternating current of constant value, said inverting apparatus comprising two groups of electric valves connected in series relation, a transmission circuit interconnecting said rectifying and inverting apparatus, the neutral point of interconnection between said groups of inverter valves being connected to said conductor, a pair of similarly disposed electric valves connected in series relation across said transmission circuit for conduction of current from said inverting apparatus under rectifier operation, the junction point between said pair of electric valves being connected to said conductor.

10. In combination, a source of alternating current of constant voltage, constant current electric valve converting apparatus connected to said source and selectively operable as rectifier or inverter, constant current electric valve converting apparatus selectively operable as inverter or rectifier, a constant direct current transmission circuit interconnecting said converting apparatus, a source of alternating current of constant voltage connected to said second mentioned converting apparatus, and means for selectively unidirectionally short circuiting said transmission circuit.

11. In combination, a source of alternating current of constant voltage, constant current electric valve converting apparatus connected to said source and selectively operable as rectifier or inverter, constant current electric valve converting apparatus selectively operable as inverter or rectifier, a constant direct current transmission circuit interconnecting said converting apparatus, a source of alternating current of constant voltage connected to said second mentioned converting apparatus, two unidirectional conductive devices connected across said transmission circuit and respectively arranged for conduction in opposite directions, and means for selectively controlling the conductivity of said unidirectional conductive devices.

12. In combination, a source of alternating current of constant voltage, constant current electric valve converting apparatus connected to said source and selectively operable as rectifier or inverter, constant current electric valve converting apparatus selectively operable as inverter or rectifier, a constant direct current transmission circuit interconnecting said converting apparatus, a source of alternating current of constant voltage connected to said second mentioned converting apparatus, two electric valves connected across said transmission circuit and respectively arranged for conduction in opposite directions, each of said electric valves being provided with an anode, a cathode and a grid, and means for oppositely controlling the potential of the respective grids to render one of said valves non-conducting when the other is rendered conductive.

13. The method of initiating the operation of a transmission system of the type wherein energy is transmitted at constant direct current between alternating current circuits of constant voltage by means of electric valve converting apparatus which consists in first energizing one of said converting stations from its associated alternating current circuit for operation as a rectifier, short circuiting the transmission circuit, energizing the other converter from its associated alternating current circuit for operation as a rectifier for current flow less than the other converter, relatively adjusting said converters until the currents fed from the two ends are substantially equal, opening the short circuit path, and then increasing the current fed by the converter at the transmitting end relative to the intended direction of power flow until the converter at the receiving end swings over to inverter operation and supplies power to the receiving circuit.

14. The method of initiating the operation of a transmission system of the type wherein energy is transmitted at constant direct current from a transmittting circuit of constant alternating voltage to a receiving circuit of constant alternating voltage by means of constant current electric valve converting apparatus which consists in first energizing the receiving end converter and operating it as a rectifier, short circuiting the transmission circuit for current flow only from said receiving end converter, energizing the transmitting end converter and operating it as a rectifier until the currents fed in opposite directions from the two ends of the transmission system are substantially equal, and then increasing the current fed by the transmitting end converter until the converter at the receiving end swings over to inverter operation and supplies power to the receiving circuit.

CLODIUS H. WILLIS.